May 4, 1965　　　W. H. McKNIGHT, JR　　　3,181,899
ASSEMBLY FOR CONNECTING PIPE TO AN APERTURED TANK
Original Filed Jan. 23, 1961
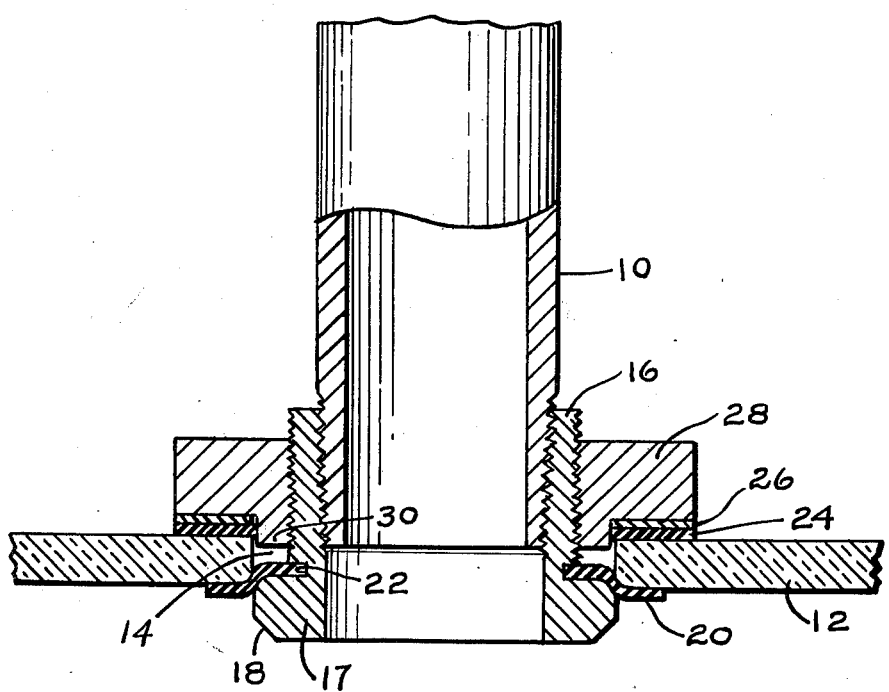
INVENTOR.
WILLIAM H. McKNIGHT JR.
BY
Clarence R. Patty, Jr.
ATTORNEY

United States Patent Office 3,181,899
Patented May 4, 1965

3,181,899
ASSEMBLY FOR CONNECTING PIPE TO AN APERTURED TANK
William H. McKnight, Jr., Corning, N.Y., assignor to Corning Glass Works, Corning, N.Y., a corporation of New York
Continuation of application Ser. No. 84,425, Jan. 23, 1961. This application Jan. 27, 1964, Ser. No. 341,487
1 Claim. (Cl. 285—161)

This application is a continuation of application Serial No. 84,425, filed January 23, 1961, and now abandoned.

This invention relates to tank connections and more particularly to a means for coupling a pipe to an open or enclosed tank.

The word tank is used herein to denote all vessels, containers, cylinders and the like. The word pipe is used herein to denote all appurtenances attached to said tank. The word connection is used herein to denote all means of attaching or joining said pipe to said tank.

Commercial methods of connecting a pipe to a tank such as welding or employing threads or flanges are extensively used. While these methods are sound, they have, in many respects, limited applications.

Welding, in addition to be limited to weldable materials, does not lend itself to easy pipe removal or change or subsequent aperture sealing. Furthermore, welding may, in many applications, irreparably damage a tank interior where it has been lined, coated or otherwise treated.

Where the tank wall is too thin for proper thread engagement, threaded connections cannot be made unless an additional thickness, such as a boss, is provided.

Flanged connections can be made only after the flange is attached to the tank, which will generally present problems similar to those of connecting a pipe to a tank.

One prior art method, departing from the above commercial means, entails the use of a lipped or flanged bushing which lip or flange has a greater diameter than the tank aperture. The bushing is inserted through the aperture from the inside of the tank and is positioned with the lip or flange being adjacent to but separated from the interior tank wall by a gasket, O ring or similar sealing device. The bushing is then secured in position by means of a nut or other clamping device at the exterior wall region of the tank surrounding the aperture. A pipe is then affixed to the bushing.

While this method overcomes the disadvantages of adversely affecting or destroying an internal tank treatment and requiring substantial tank wall thicknesses, and in addition permits comparative ease of installation and assembly, and utilization of widely varying combinations of material, it is limited to open tanks or tanks with other apertures large enough to allow the bushing to be positioned from the interior of the tank.

A further prior art method, employing sealing means similar to those described in the method immediately above, requires the tank aperture to be non-circular, such as an ellipse or oval and the bushing lip or flange to be of the same non-circular shape but larger in size. The portion of the bushing to which the pipe is affixed may be of any shape but must be substantially smaller than the tank aperture. A connection may be made to an enclosed tank or from the exterior of any tank by inserting the lip or flange through the tank aperture with the major axes of the non-circular shapes at 90° to each other. After the lip or flange has passed through the tank aperture, the bushing is rotated into position and secured by a suitable exterior clamping device.

This method overcomes the additional disadvantage of being unable to make connections to enclose tanks, however, it requires tank apertures substantially larger than the pipe to be connected, which is a disadvantage particularly in pressure vessels, and also requires fabrication of non-circular shapes and more involved clamping devices which are economic disadvantages. Furthermore, proper positioning of the bushing is difficult in some applications.

Heretofore, it has been difficult to connect a metallic or other non-glass material pipe to a glass or glass lined tank without causing damage to the glass when the connection is secured. For example, in using metallic glass lined tanks, where a pipe is generally threaded into a protruding boss, the glass lining may be unknowingly damaged by the torsional force applied to the pipe to tighten the connection.

In the tank connection of the present invention, all of the above disadvantages have been overcome. A pipe of any material may be connected to a tank of any material or to a tank which is coated, lined or otherwise treated, with the materials used being limited solely by the application.

A specific object of this invention is to provide a connection between a metallic pipe and a glass tank.

Another object of this invention is to provide an improved connection between a pipe and a tank whose interior is coated, lined or otherwise treated.

Still another object of this invention is to provide an improved connection between a pipe and a tank of any material or combination of materials.

A further object is to provide an improved connection between a pipe and an enclosed tank.

A still further object is to provide an improved tank connection where the tank wall is thin.

Another object is to provide an improved tank connection where the pipe is readily removable or changeable.

Still another object is to provide an improved self sealing tank connection where the sealing effect increases with the increase of internal tank pressure.

Additional objects, features and advantages of the present invention will become apparent, to those skilled in the art, from the following detailed description and the attached drawing on which, by way of example, only the preferred embodiments of this invention are illustrated.

The drawing shows a longitudinal section through the threaded end portion of a metallic pipe 10, as connected to a wall of a glass tank 12, also shown in section.

In accordance with the present invention a tank wall 12 is provided with aperture 14, through which aperture the end of a bushing 16, having a flange 17 provided with a beveled leading edge 18, and a thin, flat, sheet-like, resilient sealing gasket 20 disposed in recess 22, is inserted to a depth causing the resilient sealing gasket 20 to become distorted sufficiently to pass completely through the aperture. Flange 17 may be provided with a contour the same as the interior tank contour on the surface adjacent to sealing gasket 20, however, when the ratio of the tank diameter to the aperture diameter is very large said surface may be flat without affecting the sealing qualities of the tank connection. A resilient cushioning member 24 is disposed in contact with the aperture bordering region of the tank exterior surrounding the threaded portion of bushing 16, solely to cushion tank wall 12 from leveling washer 26, which washer is provided with a contour the same as the exterior tank contour on the surface adjacent to said cushioning member 24, while the opposite surface is flat. To maintain the entire assembly in place, a nut 28 is threaded onto the externally threaded portion of bushing 16 and is secured in contact with the flat surface of leveling washer 26, which nut is provided with a shoulder 30 to position the entire assembly concentrically within and about aperture 14. Pipe 10 is threaded into the internal threads of bushing 16.

The diameter of the flange 17, of bushing 16, is smaller than the diameter of aperture 14, thereby allowing said flange to pass through said aperture while gasket 20 distorts by folding away from said flange while being retained by recess 22. As soon as thin, flat, sheet-like gasket 20 completely passes through said aperture it resumes its natural position in contact with said flange 17. As nut 28 is tightened, it tends to draw flange 17 of bushing 16 into aperture 14 but is resisted by gasket 20. When the thickness of gasket 20 and diameters of aperture 14 and flange 17 are properly selected, the annular region of gasket 20, between the aperture bordering wall of tank 12 and flange 17, will be compressed to establish a fluid tight seal between bushing 16 and tank wall 12. When pressure is applied to the interior of the tank, it will tend to force the bushing in a direction to effect a further compression of gasket 20, thereby assuring a continual seal between the bushing and the tank wall whereupon the nut aids in sealing but is primarily used for centering the bushing and maintaining it in place.

Since bushing 16 is held in position by comparatively low friction forces, imposed on the two gasket surfaces, it will rotate in position should excessive torque be applied to pipe 10, thereby alleviating the danger of breaking, cracking or otherwise damaging a glass tank or a tank which has been coated, lined or otherwise treated.

It is obvious that the effectiveness of the connection is primarily a function of the diameters of flange 17, and aperture 14, the thickness and material of thin, flat, sheet-like, resilient sealing gasket 20, and the contour of the shearing edges of said flange surface and aperture. Since the gasket material will, in many applications, be limited by the service to which the tank will be put, the said diameters and contours of the shearing edges must be determined so that the gasket will not shear under conditions of temperature, pressure, force and the like, to which the connection will be subjected in use.

A typical example of carrying out the present invention is illustrated by the following description. A glass tank, having a wall thickness of ¼", was provided with a 1½" diameter aperture having a radius at the inside edge. A flanged metallic bushing, such as 16, shown on the drawing, was provided with internal and external threads and a gasket recess 22, said flange having an outside diameter of 1 7/16" and a radius on the aperture mating edge. A flat rubber sealing gasket, having a thickness of ⅛" and an approximate outside diameter of 1⅞", was positioned in said gasket recess. The bushing and sealing gasket were then inserted into the tank aperture from the exterior of the tank until the sealing gasket passed through and resumed its normal flat shape. A rubber cushioning member having a thickness of ⅛" was positioned on the exterior tank surface surrounding the bushing and tank aperture and a metallic leveling washer was placed in contact with said cushioning member. A nut was threaded onto the external bushing thread, causing the bushing flange to compress the sealing gasket against the aperture bordering region of the tank, and was secured in contact with the leveling washer. A metallic pipe was then threaded into the internal bushing thread and sealed with a commercial sealing compound. The connection maintained all pressures to the safe limits of the tank.

It is obvious that a similar connection can be made using other materials such as metals, plastics, ceramics, glass and the like, for any of the components involved. It is further obvious that the tank connection is not limited to pipes, since a gauge glass, immersion heater, temperature or pressure sensing element and the like can also be connected to the tank. Some typical applications of the present invention are: glass or glass lined hot water tanks, glass or glass lined water softener tanks, fluid or gas storage or process tanks, tanks where internal treatment is required prior to making tank connections, a wide variety of chemical applications involving both corrosive and non-corrosive materials, and many other applications.

Although the present invention has been described with respect to specific details of certain embodiments thereof, it is not intended that such details be limitations upon the scope of the invention except insofar as set forth in the following claim.

I claim:

An assembly useful in connecting a length of pipe to an apertured tank comprising a bushing internally threaded for receipt of such pipe and being also externally threaded, said bushing having an outwardly extending flange at one end of substantially the same diameter as the tank aperture and passable through said aperture into the interior of the tank, a thin, flat, sheet-like, resilient sealing gasket having an outer diameter larger than said aperture and a thickness greater than the difference between the radii of said aperture and flange, said gasket being thin in relation to its breadth, closely arranged about said bushing adjacent said flange, and distortable to the extent required to pass it through such aperture for its arrangement between such flange and the aperture bordering wall region of the tank interior, means for retaining said sealing gasket about said bushing adjacent said flange, a resilient cushioning member arranged about said bushing adjacent the aperture bordering region of the tank exterior of an inner diameter substantially the diameter of the tank aperture, a rigid leveling washer arranged about said bushing adjacent said cushioning member of an inner diameter substantially the diameter of the tank aperture, a nut threaded onto said bushing clamping said sealing gasket between said flange and the aperture bordering wall region of the tank interior and also clamping said cushioning member and leveling washer between said nut and the aperture bordering wall region of the tank exterior, and shoulder means fixedly associated with said nut disposable within a portion of said aperture, said shoulder means having an outer diameter substantially that of said tank aperture for maintaining said bushing centered therewithin, whereas said assembly is self sealing when pressure is applied to the tank interior.

References Cited by the Examiner

UNITED STATES PATENTS

| | | | |
|---|---|---|---|
| 935,984 | 10/09 | Hinck | 85—5 |
| 1,127,483 | 2/15 | Meinecke | 285—206 |
| 1,153,282 | 9/15 | Zahm | 285—161 |
| 2,277,885 | 3/42 | Rodanet | 285—347 |
| 2,454,707 | 11/48 | Meyers | 285—192 |
| 2,710,630 | 6/55 | Greer | 138—30 |
| 2,932,322 | 4/60 | Mercier | 138—30 |
| 3,031,212 | 4/62 | Oliver | 285—297 |

CARL W. TOMLIN, *Primary Examiner.*

THOMAS F. CALLAGHAN, *Examiner.*